United States Patent [19]

Reed

[11] 4,419,042
[45] Dec. 6, 1983

[54] COTTON MODULE TRANSPORT PROCESSES

[76] Inventor: Floyd W. Reed, P.O. Box 130, Glenn Allan, Miss. 38744

[21] Appl. No.: 195,105

[22] Filed: Oct. 8, 1980

Related U.S. Application Data

[63] Continuation of Ser. No. 12,146, Feb. 14, 1979, Pat. No. 4,243,353.

[51] Int. Cl.³ .............................................. B60P 1/36
[52] U.S. Cl. .................................... 414/786; 100/218
[58] Field of Search .............. 414/439, 483, 491, 528, 414/786; 239/156; 100/100, 218

[56] References Cited

U.S. PATENT DOCUMENTS 3,209,932 10/1965 Schiltz .................. 414/439
3,414,200 12/1968 Savory ............... 239/156 X
4,081,094 3/1978 Pereira et al. ................ 414/439
4,241,653 12/1980 Fagundes et al. ............. 100/218 X Primary Examiner—Robert G. Sheridan
Attorney, Agent, or Firm—Ely Silverman

[57] ABSTRACT

A tiltable bed is provided with a set of toothed chains and a control system therefor so that the chains are moved along the length of the bed at a linear speed which corresponds to the linear speed of movement of the bed relative to the ground and independent of the rate of movement of ground engaging means directed to move that bed along the ground: thereby there is no strain put on a cotton module engaged and caused to traverse the length of such bed by those moving chains while being lifted or lowered during adverse traction conditions.

3 Claims, 27 Drawing Figures

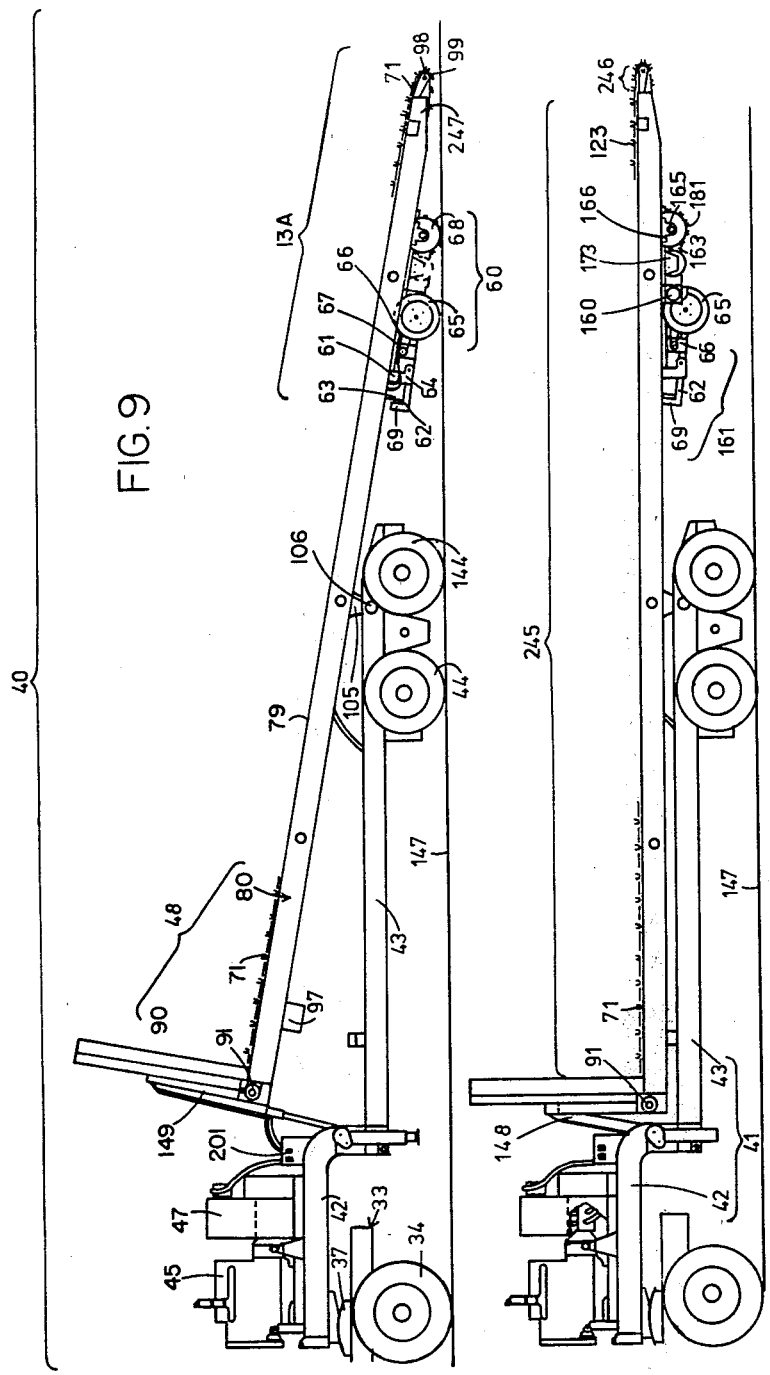

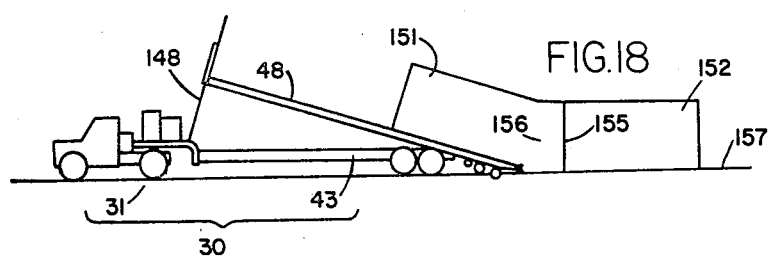
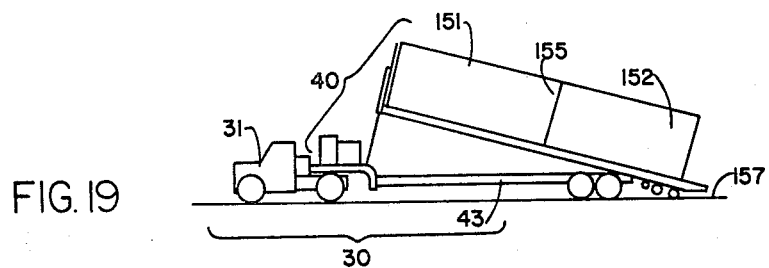
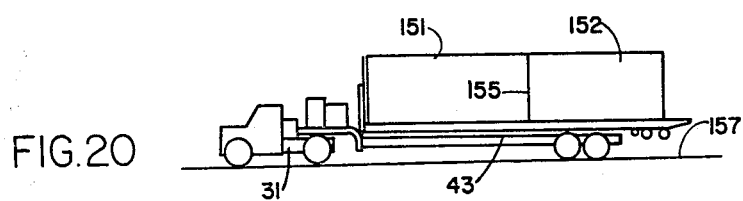
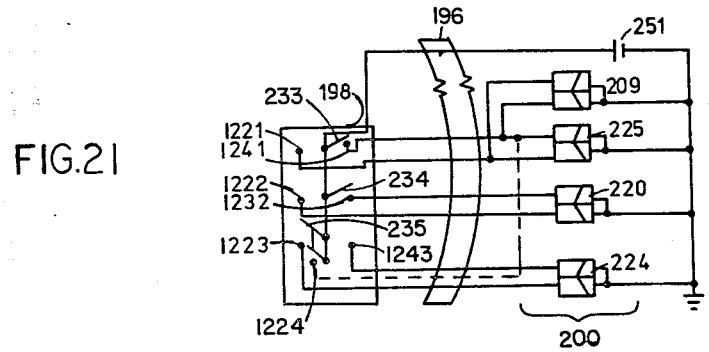

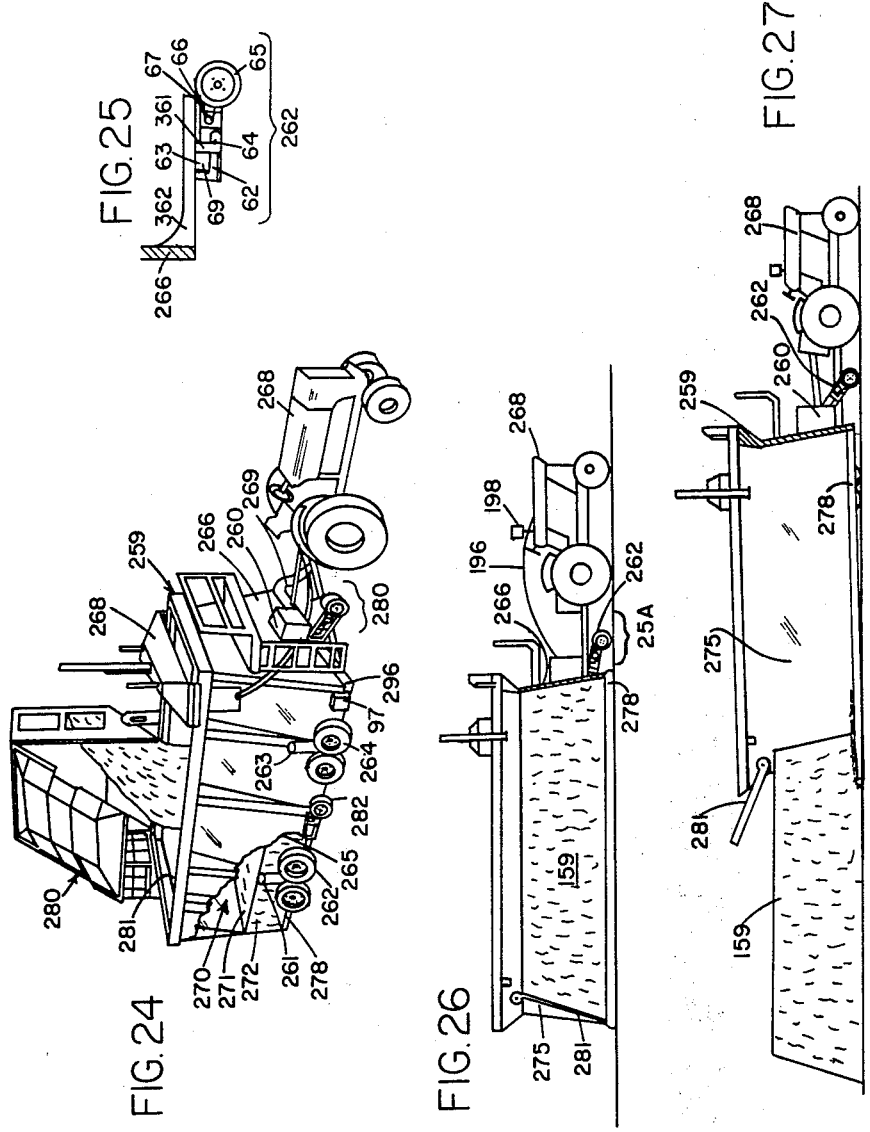

COTTON MODULE TRANSPORT PROCESSES

CROSS REFERENCE TO RELATED APPLICATIONS

This application is a continuation of my pending application Ser. No. 012146 filed Feb. 14, 1979, entitled Cotton Module Transport Apparatus now U.S. Pat. No. 4,243,353, issued Jan. 6, 1981.

BACKGROUND OF THE INVENTION

1. Field of Invention

The field of this invention is tilt bed trailers especially for cotton module loading, transport and unloading.

2. The Prior Art

U.S. Pat. No. 3,298,550 to Schlitz teaches a haystack transporting device having a conveyor moveable between a horizontal position for transportation and inclined position for loading and unloading haystacks onto or from a trailer. Lifting chains on a tiltable bed of this apparatus are driven by a gear connected to a motor of a prime mover for the wheel support for the tiltable bed. On slippage of the drive wheels for the wheel support frame, as occurs during adverse weather conditions, continued operation of the lifting chains causes separation of a cotton module engaged by such apparatus.

U.S. Pat. No. 4,081,094 to Pereira teaches a conveyor trailer for transporting agricultural commodities. Under weather conditions when the ground is wet or slippery such apparatus does not provide the force required to effectively locate its tiltable bed under a cotton module and does provide such damaging compression to such modules that such modules are later readily disrupted near such zones of compression and interference develops with stable transport of such modules; also, under such weather conditions the chain driving mechanism does not function.

SUMMARY OF THE INVENTION

In a tilt bed trailer and truck system, power driven module support and engagement wheels on the rear end of a bed tiltable on such trailer or truck provide a firm engagement with a to be lifted cotton module and a smoothed ground surface for traverse by a metering wheel; the metering wheel traverses the ground and controls a drive system for toothed chains engaging a cotton module and moving the module along the length of the tiltable bed at a speed equal to the speed of that bed relative to the module during loading and unloading of that module and independent of any slippage of drive wheels for such tilt bed trailer or truck system.

The system of metering wheel and powered chain bed is also used to unload a mobile module-forming apparatus.

BRIEF DESCRIPTION OF THE DRAWINGS

FIG. 9 is a side view of scale, at zone 9A of FIG. 1. This figure shows details of the trailer structure during its tilted position for loading and unloading of the module on such trailer.

FIG. 10 is a side view of the apparatus of FIG. 9 in the position of parts shown in zone 10A of FIG. 4 whereat the tilt bed trailer is in its transport position.

FIGS. 14–20 show a cycle of operation of the apparatus 30 of FIG. 1 of this invention in a cycle of operations wherein two small modules are successively loaded on one trailer.

FIG. 14 shows the tilt bed trailer approaching a first module; FIG. 15 shows the module loaded on the tilt bed trailer; FIG. 16 shows the module in transport position at the site of operation shown in FIG. 15 and also the position of the apparatus 30 when at the site of the second module; FIG. 17 shows the motion of the first module toward the second module at the site of the second module.

FIG. 18 shows the second module and first module in contact with each other.

FIG. 19 shows a second module lifted up on the tilt bed trailer in firm contact with the first module.

FIG. 20 shows the two modules on the same tilt bed trailer in transport position.

FIG 21 is a block diagram of the connections of the principal electrical component connection of the electrohydraulic system 200 and the remote hand control 198.

FIGS. 24–26 show the chain bed 48 and chain drive and control unit 60 of the tilt bed trailer used in combination with a module forming apparatus at a plurality of locations. FIG. 24 shows diagrammatically, in partially broken away perspective view, less than a full module loaded into a module forming apparatus prior to its movement to a different location. FIG. 25 shows a detail in zone 25A of FIG. 26 FIG. 26 shows a full module prior to discharge.

FIG. 27 shows a module being discharged from the moduleforming apparatus of this invention.

DESCRIPTION OF THE PREFERRED EMBODIMENTS

Figure 1:
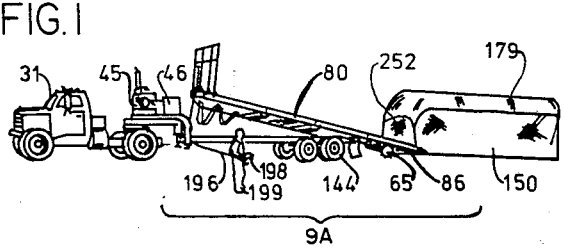
FIGS. 1 through 4 diagrammatically show in side view an overall sequence of operation of a tractor and trailer apparatus according to this invention.

The truck trailer combination 30 according to this invention comprises a tractor 31 and a trailer 40. The tractor 31 comprises a tractor motor 32 on a tractor frame 33, the tractor frame provided with tractor drive wheels as 34, tractor steering wheels as 35 and a cab 36 for an operator.

The tilt bed trailer 40 comprises a rigid longitudinally exextending frame 41 and a chain bed 48. The trailer frame 40 comprises an elevated front portion 42 and a rearwardly extending portion 43 on which are rotatably attached front and rear sets of wheels 44 and 144. The trailer 40 firmly supports a separate trailer motor 45 operatively connected to drive hydraulic pumps 201 and 202. A chain bed 48 is pivotally attached to the rear portion of trailer frame 41. An extensible piston assembly 148 is connected to and controllably serves to raise and lower the chain bed 48 relative to the trailer frame portion 43. A pivotal support or fifth wheel 37 operatively connects the frame 33 of the tractor 31 to the front frame portion 42 of the trailer 40.

The tilt bed trailer 40 is shown in the figures as 1-4 as attached to a tractor 31 which tractor is conventionally used for drawing the trailer along a road or highway as well as maneuvering the trailer relative to the cotton module. However, the tilt bed trailer 40 may also be connected to and drawn and/or manipulated behind a conventional farm tractor inasmuch as the power source comprising the motor 45, pumps, and reservoir 47 of the trailer is independent of the tractor motor as 32 on the tractor 31.

The chain bed 48 comprises a main longitudinally extending bed frame 80, a set of toothed link chains 71-78 and a chain driving assembly 60, and a framework 90.

Figure 11:
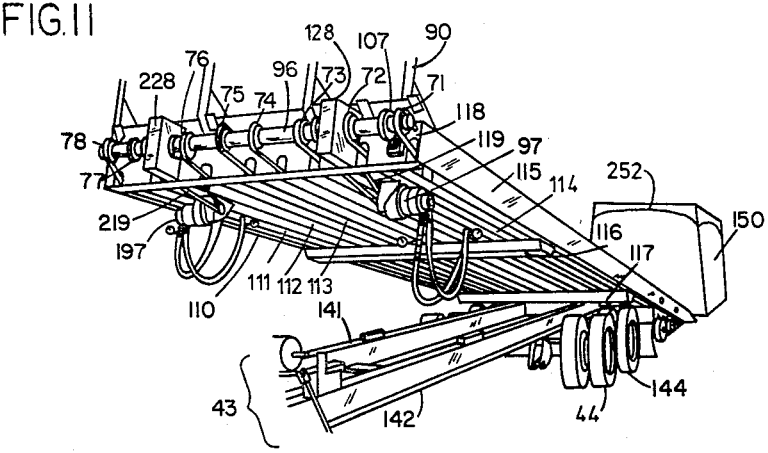
FIG. 11 is a pictorial view of part of the front end and underside of the chain bed 48.
Figure 13:
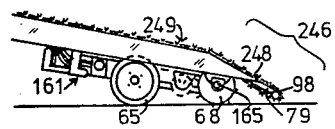
FIG. 13 is an alternative embodiment of structure in zone 13A of FIG. 9 and is drawn to same scale as FIG. 9.

The frame 80 comprises a set of rigid transversely and longitudinally extending girders 110-118 (see FIG. 11) firmly connected to each other to form a rigid flat-topped frame 80. A vertically extending rigid open framework 90 as shown in FIGS. 1 and 13 is firmly attached to the front transverse girder 118 of the rigid frame 80. The frame 80 supports a flat upper plate 108 divided into flat upper plate surface portions 81-87. Those flat plate upper surface portions 81-87 are separated by each of a set of like toothed link chains as 71-78. Each such chain, as 71, as located between a pair of two adjacent vertically and longitudinally extending parallel flanges, as 79 and 89 for chain 71 and flanges 101 and 102 for chain 72. Each of those pairs of flanges define an open topped slot, as slot 88 for chain 71 and slot 103 for chain 72 and the flanges extend the full length of the frame 80, as shown in FIGS. 10, 11 and 13 and the teeth of the chain as 123 and 124 extend above the top of the flanges. The externally extending teeth serve to engage the cotton module as 150 on which the apparatus 30 operates to move the module thereabove, as 150 in FIGS. 1-3 and 5-7, lengthwise of the frame 80 and the upwardly projecting edges of the flanges extend above the level of the bed surface portions 81-87 and engage the bottom of the module and prevent lateral or transverse movement of the module on the bed surfaces 81-87.

Each toothed chain as 71-78 is attached at its front end to a drive sprocket as 91 for chain 71 at the front end of the frame 80. Each such sprocket is firmly attached to a rigid sprocket drive shaft 96. The sprocket drive shaft 96 is rotatably supported in a series of brackets as 107, each of which brackets is firmly attached to the front transverse girder 118 of frame 80. The drive shaft is also operatively attached to chain drive motors 97 and 197 by chain drives as 119 and 219 respectively via shaft drive sprockets 129 and 229 which are fixed to shaft 96; such sprockets are located in a conventional housing 128 and 228 therefor respectively. The motors 97 and 197 are firmly attached to the frame 80 near its front end as shown in FIG. 11.

All the toothed chains 71-78 are alike and all the flanges as 79, 89, 101 and 102 are similarly shaped. Each flange as 79, 89, 101 and 102 has a circular rear end portion and each pair of flanges supports an idler shaft and each such shaft bears a sprocket for supporting the chain in the slot formed by each pair of neighboring flanges. For example, a rear idler shaft as 98 is rotatably attached to the rear end of each pair of flanges as 79 and 89 and supports thereon one idler sprocket as 99 over which one end of a toothed chain as 71 passes. While the sprocket 99 that supports the rear end of the outermost left toothed bed chain 71 is firmly attached to its idler shaft which is rotatably mounted in adjacent flanges 79 and 89 and that shaft is attached to only one toothed wheel 121 and the sprocket that supports the outer most right toothed bed chain 78 is firmly attached to a rigid idler shaft rotatably mounted in adjacent flanges (as 79 and 89) and that shaft is attached to one toothed wheel 122 like 121, each like idler sprocket on idler shafts as 98 for the intermediate toothed chains, as chain 72-77, is firmly attached to a shaft therefor which shaft rotates in adjacent flanges, as 102 and 101 for chain 72, and each such shaft is firmly attached to two like toothed wheels, as 92 and 93 adjacent the flanges 101 and 102.

Each of the like toothed wheels on the rear idler shafts, as wheels 121, 122, 92, 93, 94 and 95 has the same outer diameter as the flange adjacent thereto; e.g., toothed wheel 92 has a cylindrical surface concentric with and of the same diameter as a circular flange portion at the rear end of adjacent flange 101; the toothed wheel 93 has a cylindrical portion concentric with and having the same outer diameter as the circular end portion of the adjacent flange 102. The circular diameter of like wheels 92 and 93 and 94 and 95 and 121 and 122 and all such toothed wheels at the rear end of the chain bed 48 are all of the same size and shape and material, a strong steel. Each of the circular wheels as 92-95, 121 and 122 have projecting teeth that extend outwardly the same distance from the circular portion of such wheels as the teeth as 123 and 124 on each of the toothed belts 71 and 78 extend from the adjacent flanges as 79 and 89 for chain 71 and flanges 101 and 102 for chain 72.

Figure 4:
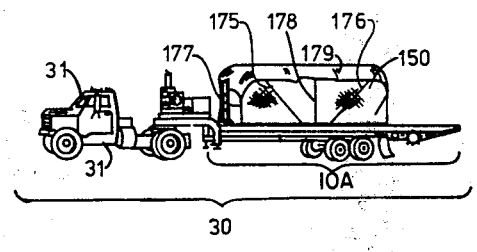

The frame 80 is provided on both sides thereof, as shown by journal 105 on the left side of frame 80, two journals, each of which is firmly yet rotatably attached to a straight rigid pivot rod 106. The rod 106 is firmly attached to the side members as 141 and 142 of trailer frame 43 so that the chain bed frame may pivot around that rod. The movable end of the piston cylinder 149 of piston assembly 148 is attached to the front end of frame 80, while piston 49 of assembly 148 is attached to trailer frame 43. The movement of that piston 49 relative to cylinder 148 serves to raise and lower the front end of chain bed 48. As the front end of the chain bed is raised, as shown in FIGS. 1 and 9 the rear end thereof is brought near to the ground. As the front end of the chain bed 48 is lowered to a travel position as shown in FIGS. 4 and 10 the rear end of that chain bed (shown in FIG. 12) is raised to a position as shown in FIGS. 4 and 10.

The chain bed movement control assembly 60 comprises, in operative combination, a metering wheel 65, a resilient metering wheel support assembly 161, a chain power servo control means 67, chain power output means—motors 97 and 197—regulated by that chain power servo control means and a traction means 68 driven by separate power means—motor 160—and chain drives 119 and 219 connected to the chain power output means. It will be noted that the traction power means 160 and traction means 68 do not connect, except through the ground movement of apparatus 30, to the chain drive shaft 96. An electrohydraulic system 200 serves function of chain movement control and bed positioning.

The ground metering wheel support assembly 161 comprises a rigid assembly support arm 61, a rigid metering wheel support arm 62, a tension spring 63, a pivot shaft 64, and a support arm stop 69 operatively connected.

The rigid longitudinally extending metering wheel support arm 62 (see FIGS. 9 & 10) is pivotally supported by pivot rod 64; that pivot rod 64 is firmly fixed to a rigid vertically extending metering wheel assembly support arm 61. The assembly support arm 61 is firmly fixed to a side frame member 115, a rigid longitudinally extending frame member of frame 80, rearwardly of the pivot support 106 and forwardly of the rear end of the frame 80.

The wheel 65 is a hard-rubber tired wheel, with its axis of rotation horizontal and parallel to the width of the bed frame 80; the wheel 65 is rotatably supported at the rear end of the arm 62 in the path of the wheels as 44 and 144. A tension spring 63 is attached to the forward end of the arm 62 and urges the forward end of the arm 62 upward, as shown in FIG. 10; the upper end of the spring 63 is firmly attached to the frame 80. A vertical rigid stop arm 69 is firmly attached to the front end of the arm 62 to limit the upward motion of the spring 63 and arm 62, as shown in FIG. 10. The metering wheel 65 is attached by a chain 66 to the input or drive of the servo pump 67.

A cleated wheel assembly 68 comprises six like cleated gage wheels, 181-186, each fixedly supported on a rigid straight shaft 165. Shaft 165 is rotatably supported on brackets as 166 on each side of the frame 80. A sprocket wheel 164 is firmly attached to the shaft 165 and is driven by a chain 163 attached to and driven by a gage wheel motor 160. Each of the gage wheels is located between a pair of flanges as 79 and 89 and pair of flanges 101 and 102 below the bed frame 80, or between, the tubes for adjacent chains as chains 71 and 72. Like gage wheels are located between like tubes for chains 72 and 73 and between the tubes for chains 73 and 74 and between the tubes for the rightmost 3 chains as between 75 and 76, between 76 and 77, and between 77 and 78.

A hydraulic motor 160 firmly attached to frame 43 to the rear of pivot 106 and and in the area of metering wheel 65 is driven through the electrohydraulic chain bed control system 200 to drive a cleated wheel assembly drive chain 163. Chain 163 is connected to a sprocket wheel as 164 which is concentric with and attached to support shaft 165 for the members 181-186 of cleated wheel assembly 68. The shaft 165 is rotatably supported in journals as 166 on each side of the frame 80 as well as at transversally spaced intervals along the frame 80 between journals as 166.

Figure 23:
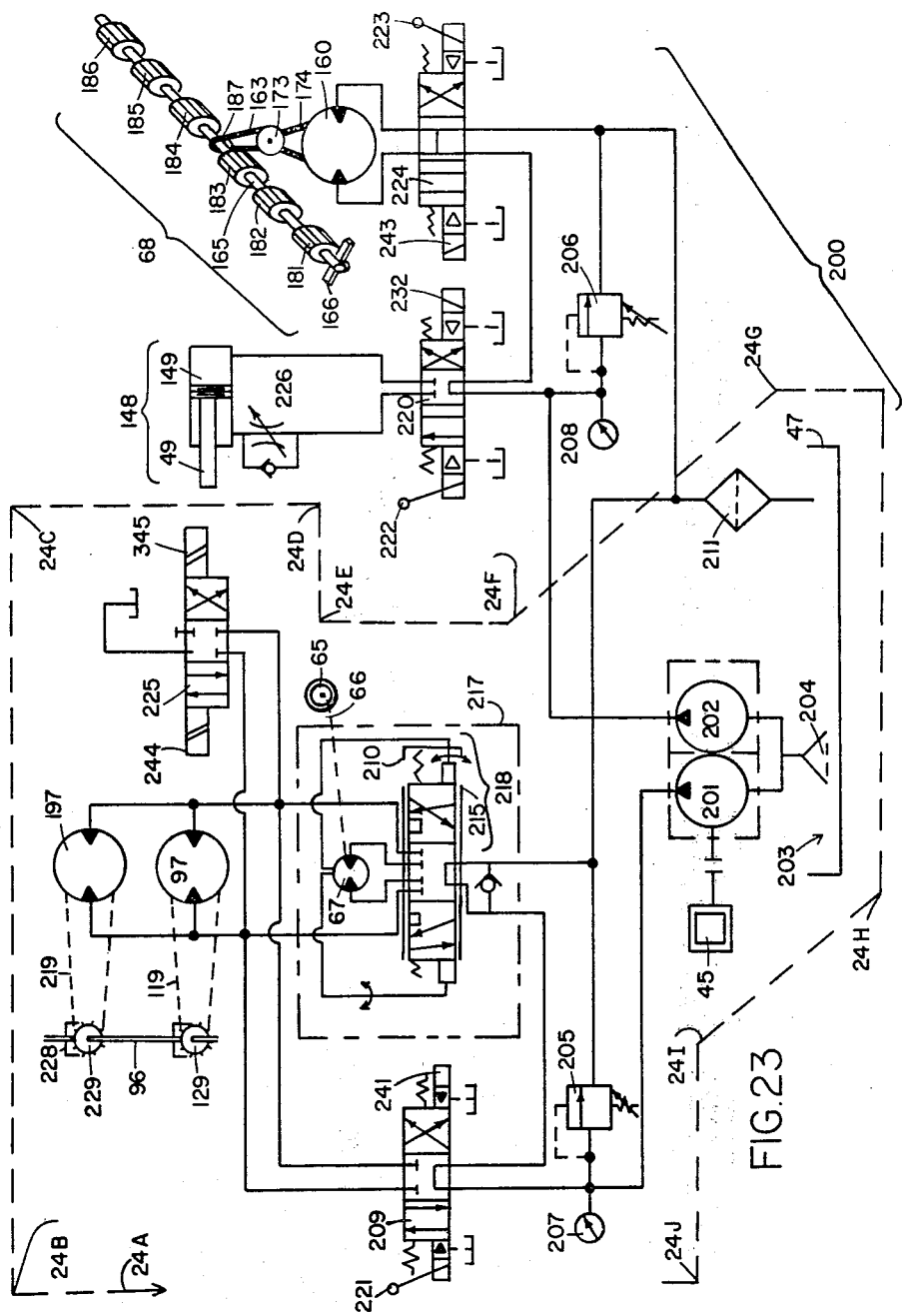
FIG. 23 is a schematic diagram, using conventional symbols, of the hydraulic components and their connections in the electrohydraulic apparatus system 200 for the chain bed 48 in apparatuses 30 and 50.

The electrohydraulic system 200 diagrammatically shown in FIG. 23 is exemplary of the relations of the components of that apparatus to perform the functions here described. That diagrammatic and exemplary showing of FIG. 23 may be supplemented by particular apparatus available to perform the functions here described.

The hydraulic pumps 201 and 202 are unidirectional fixed displacement hydraulic pumps and operatively connected to motor 45 of trailer 40, or may be pressure compensating pumps. A sump 203 is provided with an intake filter 204 as feed to pumps 201 and 202. An overload relief valve 205 is provided in high pressure line of pump 201 for overload relief of pump 201 and a similar overload relief valve 206 is provided in high pressure line of pump 202. Pressure indicators 207 and 208 are provided in high pressure output linesof pumps 201 and 202. A spring centered and pilot controlled and solenoid controlled core in valve 209 provides for passing high pressure hydraulic fluid to servo motor 67 when that 3-position core or spool is in neutral or center position in the shell of valve 209, as shown in FIG. 23.

Figure 2:
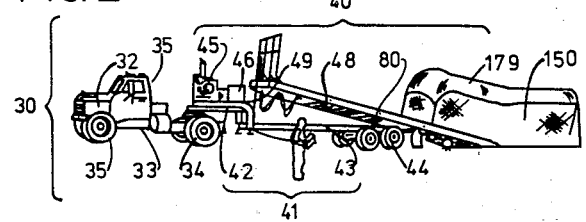
Figure 3:
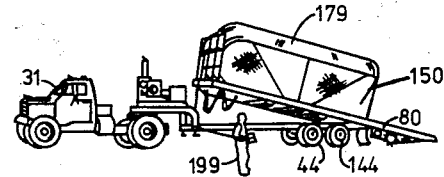

In operation, an operator as 199 may, through a hand control 198 connected by a multi-wire cable 196 connected to the solenoids in the valves of the assembly 200, control the operation of the apparatus 40 while that operator is standing, as shown in FIGS. 1-3 at a distance from the apparatus 40 so that he may observe and control the operation of that apparatus.

The valve 209 in its unactuated middle position provides for passage of hydraulic fluid under pressure from the pump 201 via valve 209 spool center portion to the servo pump 67. When the operator 199 operates the three position switch 235 to move the valve spool 224 to the right or left, the ground control wheel 65 may operate through the servo 67 to drive the pumps 97 and 197 either clockwise or counterclockwise, dependent on the positioning of the switch 235 in remote hand control switch assembly 198, when cleat assembly 68 is on the ground as in FIGS. 1, 5 and 9.

Operation of the switch 233 moves the spool of the valve 209 to left position or to the right, stops the operation of the servo mechanism 217 and then provides for hand control of the chain assembly 70 independent of the action of the metering wheel 65. The unloader valve 225 is operated in conjunction with valve 209 when the servo mechanism 217 is not operative; generally, the spool 225 moves to the right and the spool 209 moves to the left (as shown in FIG. 23) and vice-a-versa so that an operative system is provided thereby.

The control switch 234 provides for either upward or downward movement of the chain bed 80 by extension or retraction respectively of assembly 148. Switch arm 235 moves valve spool 224 to drive the cleated wheel assembly 68 and chain bed 48 attached thereto forward or backward in the frame position of FIGS. 1, 5, and 9, and with toggle switch 233 in its neutral position. At such time, arm 235 activates spool 224 to activate the toothed cleated wheel assembly 68, and spool 209 is automatically kept at its neutral position as shown in FIG. 24 and the servo mechanism valve spool 215 is responsive, via the servo motor 67 to the metering wheel 65, and operatively connected to the pump 201 whereby the motors 97 and 197 and chain drives 119 and 219 are actuated by the metering wheel 65 when the cleated wheel assembly 68 is actuated, whereby the movement of the chain drive assembly 70 depends upon the rotation of the metering wheel.

In operation of apparatus 30 as shown in FIG. 1, by extension of piston assembly 148, as by operating toggle switch 234, the tractor trailer combination 30 has its bed frame 80 tilted relative to the main frame 43 as shown in FIG. 1. The pivotal attachment of the frame 80 to the rear trailer frame 43 and extension of the piston assembly 148, in view of the extension of the bed frame 80 rearwardly of the pivot shaft 106, provides that on full extension of assembly 148, a large portion of the weight of the trailer frame—and module, if any—is borne on the cleated wheels of cleated wheel assembly 68, with such weight removed from the trailer wheel sets 44 and 144. Accordingly, the rotational movement of the cleated wheels 181-186 provides for increased grip of the ground therebelow and control of the traversing movement of the chain bed 48 relative to the length of the stationary cotton module 150. The tractor 31, at this point in the operation, is in its idle or free wheeling condition so that it moves with the trailer assembly 40 on actuation of cleated wheel assembly 68 by assembly 200.

In the corresponding operation of the truck embodiment shown in FIGS. 5-8, the weight of the chain bed 48 is removed from the truck rear wheels as 54 and 254 which are likewise raised by piston assembly 148 and frame 80, so the frame 53 of the truck moves when cleated wheels as 181-186 of the truck tilt bed trailer combination 50 engage the earth against which such cleated wheels are forced by the piston assembly 148 lifting the chain bed as 48 while such chain bed is restrained as in apparatus 30, by its attachment through a pivot rod as 106 to the truck frame portion 53. Under control of an operator as 199, as shown in FIG. 1 cleated wheels engage the ground and urge the chain bed 48 toward the module 150. The movement of cleated wheels 181-186 against the ground in view of the pressure applied thereto, develops a smooth surface over which the metering wheel 65 passes in operation of apparatuses 30 and 50.

The sets of wheels 44 and 144 of apparatus 30 and wheels 54 and 254 also provide a smoothed roadway over which the metering wheel 65 passes.

The movement of cleated wheels 181-186 causes, in hard dry terrain in a smooth movement of the chain bed 48 in a direction parallel to the length of the chain bed. In muddy terrain the movement may be irregular, but in either case, the metering wheel 65 is then urged into contact with the ground surface by the spring 63, the chain drive 66 from the metering wheel 65 to the servo actuates rotor of the servo 67 and provides fluid power from pumps 201 and 202 when under control of the operator 199 using toggle switch 235 of the remote control 198, to drive the motors 97 and 197 and, accordingly, to actuate the chain shaft drive sprockets 129 and 229 and the chain drive shaft 96 and the chain drive sprockets for each of the toothed chain 71-78 and cause those toothed chains to move upwards along the frame 80 while the frame 80 in turn moves toward and under and below and along the length of the cotton module 150. Each toothed chain of the set 71-78 moves an idler sprocket therefor, as 98 for chain 71. Each such idler sprocket in turn moves the adjacent cleated lift wheel, as cleated lift wheels 92 and 93 adjacent the sprocket for chain 72 and cleated lift wheel 121 adjacent sprocket of chain 71 and cleated lift wheel 122 adjacent sprocket of chain 78 and lift wheels 94 and 95 adjacent the sprocket of chain 73 and like lift wheels and like cleated lift wheels adjacent sprockets of each of the other chains 73-77.

The teeth as 123 on the toothed chains 71-78 and the cleated lifting wheels as 92-95 engage the module and, at any moment in the operation, provide a lifting action on successive portions of the module. The teeth do not move longitudinally relative to the module. As each increment of the module 150 is lifted up by the lifting wheels, the teeth as 123 of the chains 71-78 maintain a stationary position with each portion of the module contacted thereby.

At each moment of operation of the chain bed 48, as shown in FIGS. 1-3 and 4-7 and 15, 18 and 19, each of the chains 71-78 moves along the length of the chain bed 48 at the same linear speed that the rear end of the frame 80 moves along the length of the module. Even though the drive wheels may slip or spin while urging the frame under the module, the movement of the chains at any moment is equal to the linear or traversing movement of the frame relative to the ground. If the gage wheels spins, there will be no movement of the chains 71-78 other than the traversing longitudinal movement of the bed relative to the length of the module. Accordingly, no tensile stress is placed on the module, for instance, by movement of the chains upwards along the frame toward the upper end thereof while the module is absolutely or relatively stationary. Such action would result in a tearing of the module and such action does occur in other apparatuses, but not in the apparatus of this invention.

In this apparatus when metering assembly wheel 65 is activated, there is no movement of the bed chains 71-78 unless there is a movement of the bed frame relative to the ground. Because of the steeper angle of the chains to the horizontal at the rear end 246 of the chain bed 48, there is a slight compression of the module in the horizontal direction on the initial movement of the module from the ground to the major or less slightly sloped portion 245 of the frame 80.

Accordingly, as shown in FIG. 2, the module moves upward relative to the bed frame as the module moves rearwardly (to the right as shown in FIG. 2) until the entire module is loaded on chain bed 48 as shown in FIG. 3. Then the piston assembly 148 is retracted and the module 150 comes to rest on the horizontally extending frame 80. In this position, as shown in FIG. 4, the module is transported along a road or highway by the tractor 31 drawing the trailer assembly 41 therebehind with the module loaded and firmly held on the trailer. The upstanding flanges of the chain tube serve to prevent lateral motion of the module and the teeth on the chains also engage the module. Additionally cables as 175, 176, 177, ad 178 are provided to engage the tarpaulin 179 laid over the top of the module.

In the operation of the truck embodiment as shown in FIGS. 5-8 the module moving operation is substantially the same in regard to the bed frame control relative to the module. More particularly, the bed frame 48 is raised relative to the frame of the track by the same piston assembly 148 and the weight is taken off the rear wheels 54 and 254 of the truck, so that the weight of the module and bed frame is supported by the front wheel of the truck and the cleated wheel assembly 68 of the chain bed assembly 48. As in the operation of the apparatus 30, as shown in FIGS. 1-4, the operator 199 operating through the remote control apparatus 198 operates the electrohydraulic system 200 to move the chains of the chain bed in a manner to locate the module on the frame 80 without disrupting the module. As is above described in the apparatus shown in FIGS. 1-4, this is accomplished by a traverse of the chain on the frame 80 at the same linear rate as the bed frame 80 moves over the ground and this traverse of the chains is controlled independently of any slippage of the cleated wheels on the ground during such operation.

During adverse traction conditions the piston assembly 148 may be adjusted (and then have the spool of its valve 220 moved to its neutral or locking position) so that some weight may be applied to the drive wheels of the truck 50 or of trailer 31 so such wheels may apply a tractive force to the ground and supplement the force urging the frame 80 along the ground relative to the length of the module and so locate the frame 80 below the module and lift the module onto the frame without destruction of the module as above described.

The metering wheel 65 has only an 15 ft. pound torque to move it and is accordingly readily rotated in a manner that provides an exact measuring of the traverse along the ground and, with servo motor 67 and the chain drive attached thereto, a moment-to-moment equal movement of the toothed chains 71–78 on the chain bed 48 corresponding to the longitudinal translation movement of the frame 80 relative to the module whereby each such module is moved without tensile stress along its length during loading of the module as 150 on to the chain bed 48 from position of FIG. 1 to the position of FIG. 3 (or 4 to 7).

The apparatuses of this invention provide cycles of operations wherein two small modules, as 151 and 152 in FIGS. 14–20, are successively loaded on one apparatus as 30 or 50 at different sites. This operation is described principally in terms of the truck trailer combination 30 although the truck combination 50 also performs such process, as below described.

Figure 14:
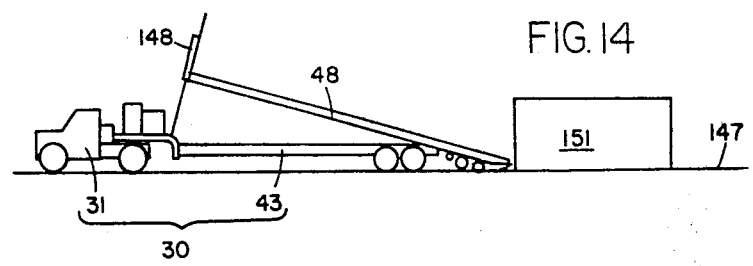
Figure 15:
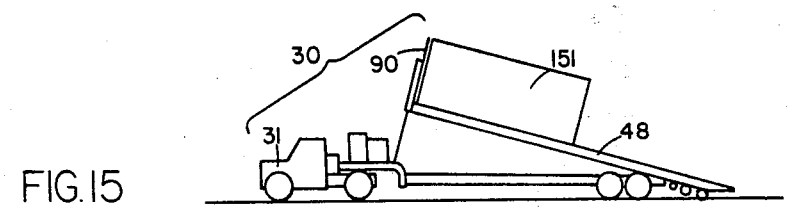
Figure 16:
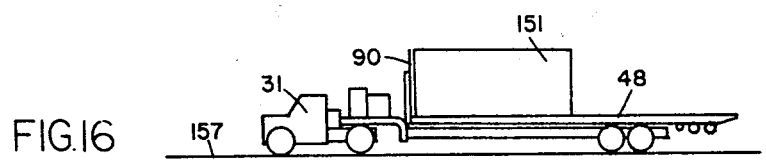

The apparatus 30 is shown in FIG. 14 approaching a module 151 at site 147 in the same manner as shown in FIG. 1. The module 151, located on a site 147, is 15 to 16 feet long rather than the longer 30 to 35 foot module shown handled in FIGS. 1–8. The apparatus 30 operates to lift the module 151 on to the forward part of the chain bed 48 as shown in FIGS. 1 to 4 and above described. The apparatus 30 under control of an operator as 199 then moves the module 151 on the chain bed 48 to a second site, 157, as shown in FIG. 16, adjacent a second module 152.

Figure 17:
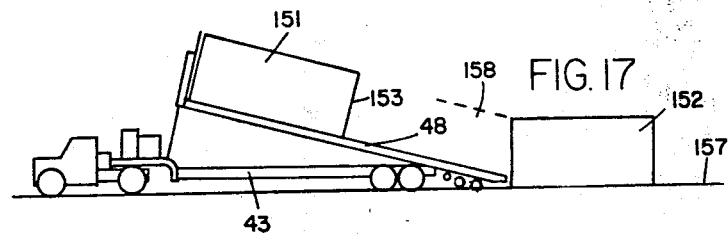

At site 175, as shown in FIG. 17, while the module 151 on chain bed 48 is finally brought into proximity with the second module 152, there is initially some space between the rear end of the chain bed 48 and the front face 154 of the module 152 at site 157, as shown in FIG. 17. The rear end of chain bed 48 is then brought into direct contact with the front end face 154 of the module 152. As shown in FIG. 18, the module 151 is then moved downwardly of the chain bed 48 by the drive chain assembly 70 under control of the toggle switch 233 of remote control assembly 198.

The rear portion 156 of the module 151 is moved into forward contact with the front portion 154 of the module 152 so that the rear surface 153 of the module 151 is contiguous with the front surface 154 of the module 152. There is some deformation of the module face 153 as it contacts the module face 154 as the module 151 is brought to the position 158 (shown in dotted lines in FIG. 17). The truck trailer combination 30 then moves to the left as shown in FIG. 18 while chain set 70 discharges module 151 therefrom leaving a lower zone 156 that is deformed relatively elastically between the major portions of modules 151 and 152. Thereafter, from position of FIG. 18, the chain bed 48 is moved under the rear portion of module 151 and the entire portion of module 152 to bring both up to the top of the trailer chain bed as shown in FIG. 19. Following such location on chain bed 48 of the modules 151 and 152, the extended piston assembly 148 is retracted and the apparatus 30 with modules 151 and 152 thereon departs from site 157. This operation provides an extremely firm attachment of the modules 151 and 152 to each other which prevents their shifting relative to each other during transport.

The operation of FIGS. 14–20 thus performed is only effective because the control system 60 provides for (a) chain drive independent of any movement of chain bed relative to the ground in combination with (b) apparatus which provides for the linear equal traverse of chain along bed 48 and traverse of the chain bed 48 along the length of the ground on which the module is located. Also, the apparatuses provided herewith, in view of the rear portion 246 as shown in FIGS. 10 and 13, allow that the angle of the trailer bed 48 may be effective to raise the module yet operate within a predetermined length, 45 feet as established trucks to operate on highways.

In side view, the chain bed 48 has a front upper major level portion 245 and a rear major portion 246. The front portion 245 extends for the major portion of the length of the chains and bed portions 81–87, of the frame 80, as shown in FIGS. 9 and 10, which figures are, like FIG. 13, to scale; the rear or second sloped bed surface portion 246 is at the rear of portion 245 and continuous therewith. The second surface portion extends longitudinally at an angle of up to 15° to the first surface portion, such angle is preferably between 10 and 15 degrees. In the preferred embodiment of the apparatus, as shown in FIG. 13, the second surface portion 246 extends for up to 30 inches forward from the rear sprocket shaft 98 to a point above the axle shaft 165 for the cleated wheel assembly 68. The angled portion 246 in the embodiment of FIGS. 9 and 10 begins rearwardly of the axle 165.

In the frame bed 48 of apparatuses 30 and 50, the bottom of the girders as 115 forming the frame 80 have an upwardly sloped portion 247 at the rear end of each such girder. In the embodiment of FIG. 13, each girder has, at its rear end, a downwardly sloped portion 248 at the top edge of the girder.

In the embodiment of apparatus of FIGS. 1–20 and 24–27, a tube for each toothed chain is formed by adjacent flanges, as flanges 79 and 89 for chan 71 and as by flanges 101 and 102 for the chain 72; like bent tubes are formed for all the like chains 72–77 intermediate the end chains as 78. Such tubes extend downwardly and rearwardly at an acute angle of about 15 degrees in bed portion 246 in FIG. 13 and 246 in FIG. 10 relative to the direction of the remainder of the chain portion as shown as 249 in FIG. 13 and 245 in FIG. 10.

Figure 5:
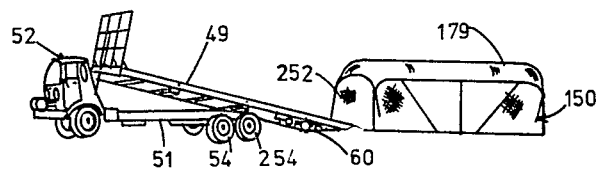
FIGS. 5 through 8 diagrammatically show in side view an overall sequence of operation of a truck type apparatus according to this invention.
Figure 6:
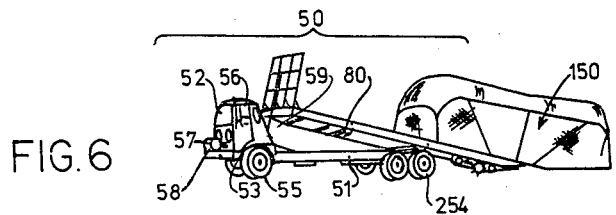
Figure 7:
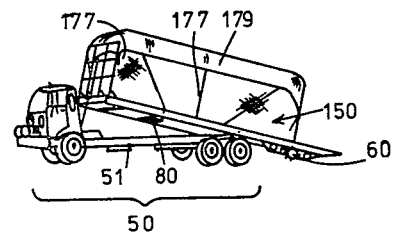
Figure 8:
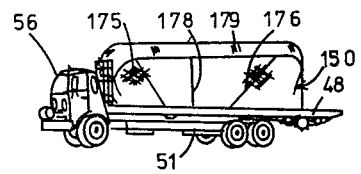

These angled bed portion 246 provides for a relatively shorter length from the front end of the chain bed 48 to the points of contact of the bed chains with the front portion of the module, as 252, shown in FIGS. 1, 5 and 11.

Each girder as 110–115 is formed of a vertical flange as joined at the bottom thereof; thus, flanges 79 and 89 joined to form girder 115, and flanges 101 and 102 form girder 114. These girders extend below the top chain bed surface 108, and the transverse girders as 116 and 117 and 118 are joined firmly to those longitudinally extending girders. Those girders are open at the top and form slots; thus girder 115 forms an upper slot 88 and girder 114 forms an upper slot 103. The chains as 72–78 each operate in a slotted girder such as 114 for chain 72.

The truck embodiment 50 comprises a truck frame with a motor 52, that motor having a crank shaft and that motor being mounted on the forward portion 53 of the frame. The rear portion 51 of the truck frame is provided with sets of drive wheels 54 and 154 and the front portion of the truck frame has standard steering wheels as 55 and a cab 56 for the operator. This apparatus is provided with a power take-off 57 attached to the engine crank shaft and two power take-off drives pumps 58 which are connected by lines to hydraulic equipment to the rear as in assembly 200. Truck 50 has a piston assembly 59 is identical to piston assembly 148 which is connected between the frame 51 and bed 48 as bed 48 is connected to frame 43 in the trailer assembly 40. The bed 48 is pivotally attached to the rear portion 51 of the frame of the truck in the same manner as chain bed assembly 48 is attached to frame portion 43 of trailer 40.

Figure 12:
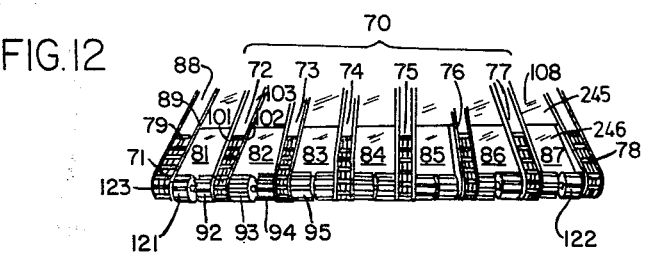
FIG. 12 is a rear view of the apparatus taken in direction of arrow 12A of FIG. 10.

Each of the chains as 71–78 is a conveyor series chain with large rollers. Each of the teeth on those chains is a U-shaped upwardly open short steel length, as 123 on chain 71. The U-shaped teeth are upwardly open during the travel of the chains on the upper surface of the chain bed 48, as shown in FIG. 12. All such teeth as 123 are of the same size and extend transverse to the length of the chain, as 71, to which attached. Each such tooth is attached to pin link plates of alternate links of the chain.

Figure 22:
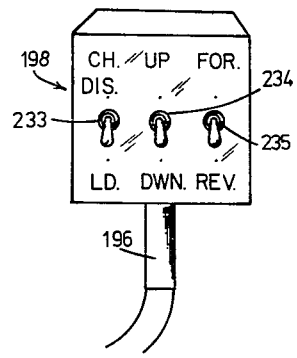
FIG. 22 is a diagrammatic front view of the hand control 198.

The remote hand control 198 comprises a box with arms of 2-way snap-toggle switches 233, 234 and 235 thereon. These switches are shown pictorially in FIG. 22 and electrical connections therefore are diagrammatically shown in FIG. 21. The switch arm 233 is used for separate drive of chains 71–78 and is connected to the solenoids 221 and 241 of hydraulic valve 209 and solenoids 244 and 245 of valve 225 by contact points 1221 and 1241 respectively. The switch arm 234 provides for up and down movement of the front end of the chain bed by operation of the piston assembly 148; that arm 234 is connected to the contacts 1222 and 1232 for solenoids 222 and 232 respectively of the valve 220 to provide for flow of fluid into the piston cylinder 149 and out of it. Manually operated arms, shown schematically, are also provided for solenoids 221, 222 and 223. The toggle switch on 235 is provided with contacts 1223 and 1243 for the solenoids 223 and 243 respectively of the valve 224.

The entire envelope structure 217 shown in dashed lines in FIG. 23 of the electro-hydraulic system 200 is a Ross H.G.B. Hydroguide steering unit as in Ross Manufacturing Co. brochure No. HGB200 and as described in U.S. Pat. Nos. 3,600,893; 3,452,543; and 3,288,034; and 3,385,057. The structural unit 217 is a fluid control including a housing having a fluid inlet for connection to discharge side of the main fluid pumps 97 and 197, an outlet for connection to the suction side of the main pumps and a pair of ports for connection to the opposite sides of dual acting hydraulic device 218, a balance cylinder of a power steering system, for controlling the flow of pressurized fluid. The control of 217 includes a gear set 67 which serves as a fluid meter, and the spool valve 215 shiftable axially in a housing 210 to control the flow through the inlet, the gear set, the cylinder ports and the outlet; axial shifting of the spool valve 215 is in response to rotation of the pump 67. The cylindrical spool or sleeve valve shown as 215 is carried for axial and rotational movement and is shifted axially in opposite directions to provide movement of the servomotor in opposite directions and comprises a series of axially spaced circumferential lands and grooves which cooperate with a series of similar lands and grooves in the housing or bore wall to control the flow of fluid through the motors 97 and 197. The spool 215 and housing 210 form the principal components of an infinitely positionable valve assembly 218. Generally, the gear set or pump 67 is driven through chain 66 by the metering wheel 65 and moves the grooved spool 215 within the bore of valve housing 210.

The spool 215 is a rigid cylindrical spool approximately 8 inches long and does not vary in diameter but has various grooves in it. The spool 215 travels axially approximately 0.125 inch on either side of its center. When the spool 215 shifts, it allows the various grooves therein and in the bore of the valve body 210 to come adjacent to each other and the hydraulic oil flows through the grooves or lands, which vary in width. Thus the cross-sectional area for the path of the hydraulic fluid flow is determined by the position of the spool 215 which in turn is varied by the amount of input force applied thereto by the rotor of the pump 67 urging oil axially against that spool and the springs that serves to center that spool.

The standard servo valve spool shown diagrammatically as 215 is capable of infinite positioning. The core or spool 215 and case or housing 210 of valve 218, accordingly, provide an amount of hydraulic fluid to be sent to the motors 197 and 97 which is directely proportional to the speed of the metering wheel 65 and the servo or pump 67 to which wheel 65 is attached.

The servo 67, broadly, acts as a volumetric bleeder to determine the amount of high pressure fluid sent to each of motors 97 and 197, as CHAR-LYNN series 6000, each of 125 cu. in. per revolution, which have no effective (less than 1%) change in speed with change in pressure from 400 to 3000 p.s.i., hence are insensitive to torque load changes met by sprocket wheels 129 and 229 to load changes met by chains 71–58 during chain bed 48 operation. CHAR-LYNN series 6000 hydraulic motors are described in Catalog 11-836 of Eaton Corp., Eden Prairie, Minn., July 1976.

An electronic speed control system may also be used [generally, as shown at page 148–149 of "ABC's of Hydraulic Circuits" by H. L. Steward and J. M. Storer, Sam's Publishing Company, 1973] to sense and measure the motion of the metering wheel 65; hence the speed of the chain bed 48 relative to the ground on which the module as 150 is located and so electronically control the speed of the motors 97 and 197 to maintain the linear speed of the chains 71–78 along chain bed 48 to be the same as the linear speed of the chain bed relative to the ground, in place of unit 217, but the hydraulic apparatus 217 herein provided is satisfactory at the speeds (in range of 0.1 to 1.5 miles per hours) at which chain bed 48 travels.

As shown in FIG. 9, for operation of apparatuses 30 and 50, and also in FIG. 13, the cleated wheels 181–186 bear on the ground and the chains 71–78 are supported 1 to 2 inches above the level of the ground to avoid interference by the ground with the movement of the toothed chains. There is 35 ft. 6 in. from front of guide plate 118 to the rear of teeth on chains 71–78 and on the lift wheels; cleated wheels 181–186 are each 15 inch in diameter with $\frac{3}{4}$ inch cleats projecting radially therefrom. Lift wheels are $4\frac{3}{4}$ inch diameter with $\frac{1}{4}\times\frac{1}{4}$ inch cleats.

During the initial contact of the chain bed with the module, the lift wheels as 92–95, 121 and 122 at the rear end of the chain bed forcefully contact the front wall as 252 of the module as 150 and provide a lifting action thereon. This combination of jamming and lifting develops a high torque resistance to the rotation of the lift wheels, yet the initial speed of the toothed chain is then kept steady in spite of such resistance.

Although the front end module is relatively flexible and compressible for a length of 1 to 8 inches, the initial jamming force of frame 80 and/or the resitive force of the module 150 is large; hence the motors 97 and 197 act against a substantial load yet the relation of rotational movement of metering wheel and linear movement of the chains along length of bed 48 is stable on initiation of module loading onto bed 48.

As the module is lifted above the rear portion 246 of the chain bed, the cushioning action of the module synergistically reacts with the torque developed by the hydraulic motors 97 and 197 maintains a smooth mechanical resistance to the turning action of hydraulic motors 97 and 197, yet the increased module weight provides a steadily increasing resistance to the movement of the toothed chains 71-78 at a fixed angular position of chain bed 48 to the horizontal. Also, the frictional resistance developed by urging of the increased length of module along the bed length provides an increasing resistance to the movement of the toothed chains yet motors 97 and 197 provide, at a steady speed of wheel 65, a constant speed of the toothed chains along the chain bed length and along the length of a module as 150. The faster the chains attempt to move the module along the chain bed, the greater the friction resistance; nevertheless motors 97 and 197 operate at a constant ratio of r.p.m. to linear speed of metering wheel 65 hence speed of chains 71-78 along the surface of the cahin bed equals linear movement of wheel 65. Such chain motion occurs only when the metering wheel 65 is actuated, whereby the speed of the toothed chains along the length of the chain bed is maintained at the same speed as the motion of the metering wheel along the ground and the motion of the bed frame relative to the module.

During module unloading, notwithstanding varied friction resistance to module movement and differing weight of module on the toothed chains and bed, because of the independence of the speed of the motors 97 and 197 to the torque applied thereto in the range of speeds and weights applied to bed 48, equal speeds of discharge of the modules from chain bed 48 are also maintained relative to the movement of the bed 48 relative to the ground. A 30 foot module has been raised onto a bed as 48 and returned to ground therefrom with a total change in length of less than 2 inches after eleven such cycles of raising and return.

The tiltable chain bed 48 is thus provided with a control system 60 therefor so that the toothed chains 71-78 move along the length of the chain bed during raising of the module at a linear speed which at any moment of operation of the apparatus 30 (or 50) equals (+ or −1%) the speed of movement of the bed relative to the ground and independent of the rate of movement of ground engaging means as 68 adapted to move that bed along the ground. Thereby, there is no tensile strain put on the cotton module during the procedures of loading or unloading on the ground by the apparatuses 30 and 50.

If one way automatic discharge operation of a servo valve as 218 is desired or necessary, the hand held control box 198 switch arm 235 may have 2 contacts, one to pass current to contact 1233 for push solenoid 223 of valve 244 and another contact and line (shown in dashed lines) to pass electrical current to switch contact 1241 and actuate the push solenoid 241 of valve 209 and push solenoid 244 of valve 225 to drive motors 97 and 197 to move the toothed chain to discharge mode Energizing the solenoid is here regarded as pushing the portion of the valve spool adjacent the solenoid energized [as in Industrial Fluid Power Text, Vol 1, Womack Energineering Supply, 1968, page 112].

An improved module forming bin 259 having left rigid vertical sidewall 275, right rigid vertical sidewall 265, a front rigid wall 266 and a moveable rigid rear wall 281 is provided with a rigid bottom floor assembly 278 identical with the chain bed 48. Each of the sidewalls 265 and 275, as shown for sidewall 265, is provided with exterior adjustable wheel supports 261 and 263 for tandem sets of wheels as 262 and 264. Walls 265, 266, 275 and floor assembly 278 are firmly and rigidly joined together along the full length of each of their adjacent edges and support a powered vertical tamping assembly that is positionable and readily moveable along the top of the sidewalls for the full length of the chamber or volume 270 within the flat smooth interior surfaces of the bin wall 275, 265, 266 and 281. The module forming bin provides the space or volume 270 in which a volume of field cotton is compressed to form a dense module as is conventional in cotton module formers, to produce a large bale of compressed cotton, usually from 24 to 32 ft. long, from 6 to 9 ft. wide and 6 to 10 ft. high and of 10 to 15 pounds per cubic foot density.

The bin 259 is provided with a control system 260 in an enclosure therefor on front bin wall 266. The control system 260 has substantially the same components and in same connection as the portion of control system 200 shown in Zone 24A-24J of FIG. 23 provided for the apparatuses 30 and 50 above described. Bin 259 is drawn by a V-shaped drawbar frame 269 behind standard farm tractor 268; frame 269 is shown broken away in zone 280 of FIG. 24 to show assembly 262.

In FIG. 24 the bin 259 is shown being loaded by a field cotton harvester 280 at a first site and such bin is shown only partially filled by a cotton mass 272 to a height 271. The mass 272 is a compressed module of field cotton; the remainder of the interior 270 of the bin 259 is empty. This bin apparatus 259 including assembly 278 and mass 272 therein may then be drawn from the first site and filled at another site 283; the cotton module there produced is a standard or full height and of a size and shape as module 150 in FIGS. 1 through 8.

In Zone 25A of FIG. 26 a metering wheel assembly 262 is shown. That assembly is shown in more detail in FIG. 25. That metering assembly 262 is an assembly substantially entirely like assembly 161 and comprises the wheel support 62 which is pivotally supported at a pivot as 64 on an assembly support 361 like 61. A spring 63 is attached to the arm 62 and to a rigid cantilever arm 362 firmly attached to the front bin wall 266; assembly support arm 361 is firmly attached at its top to the rigid cantilever arm 362. A metering wheel exactly as 65 is rotatably supported at the front end of wheel support arm 62 and is connected by a chain 66 to a servo pump as 67. The servo pump 67 operates through motors as 97 and 197 located on the bin 259 to drive chains as 71-78 in the assembly 278. On actuation of a toggle switch as 235 on the remote control assembly 198 (shown in FIG. 26, and the same as in FIGS. 21 and 22) and movement of the tractor 268 in a direction away from the module 159 and lifting or other displacement of the rear bin wall 281 from its module forming position of FIGS. 24 and 25, the module 159 is moved rearwardly of the assembly 271 by assembly 278 at the same speed that the tractor moves to the right as shown in FIG. 27. The module 159 is then moved from its position within the bin 259 outwardly thereof to the outside of the module forming bin 259 without disruption. Such module may be lifted up on a transport apparatus as 30 or 50 as shown in FIGS. 1-4 or 5-8 for transport to a gin or other location.

The structure of the bin 259 includes a widening of the vertical transverse cross-section in passing from the front wall 266 to the rear wall 281; i.e. there is a uniformly gradual widening from front to rear of chamber 270 and, hence, a greater transverse distance between the walls 265 and 275 at the rear of the apparatus 259 (the left side as shown in FIG. 27) then at the front end, (the right side as shown in FIG. 27). This difference is about 8 inches for a 30 ft. long module 159. Such wedge-shaped configuration allows for release of the module 159 from the bin 259 in which formed.

While the assembly 262 is shown at the front of the wall 266 in FIGS. 24 and 26 it may, alternatively, be located at position 282, at the side of the bin 259 and in the path of the wheels as 262 and 264.

The assembly 278 is composed of the open top tubes or girders as 110-115 and chain assemblies as 71-78 for assembly 48. However, the motor 97 and 197 are located as shown for motor 97 at the front lower edge and outer side of wall 265 to there connect to a chain sprocket drive shaft 296 like 96 in assembly 48. A like motor as 197 is located on the front outside of the left wall 275 in the same position relative to the drive shaft 296 as shown for the hydraulic motor on the right sidewall 265.

The wheels 262 and 264 are extended for movement of the partially loaded apparatus 259 as in FIG. 24 to move such partially loaded bin to a site as 283 at which the remainder of the module 159 is formed and retracted during module formation. Accordingly, the apparatus 259 provides for partial formation of a large module of compressed field cotton at one site, movement of the partially formed module to one or more other sites, addition to or completion of the module formation at such other sites and discharge of the completed module from the bin 259 by the module moving and supporting floor assembly 278.

For ginyard operation, the trailer 40 may have a straight tongue drawbar and use a tractor power take-off for input horsepower to actuate system 200 in place of motor 45, and the axles of the sets of wheels as 44 and 144 may be located on a straight frame supported on a pivotal frame axles with its axis in line with those wheel axles and such axis passing through rather than below frame 43. The modules 150 are usually 7 ft. 6 in. high, 7 ft. 9 in. wide at bottom, and 32 ft. long. The modules as 150 usually weigh a total of 20 thousand pounds but 30 thousand pounds can be handled.

The 8 inch wide cleated wheels 181-186 provide a firm smooth surface on which the control wheel 65 travels during adverse conditions such as mud or loose sand. The control wheel 65 runs in the tracks of the truck rear wheels as 54 and 254 and in tracks of trailer rear wheels as 44 and 144 during unloading operations so that there is then also prepared a compressed smoothed surface on which the control wheel 65 may be operated. In conditions where the cleated wheels 181-186 might spin the pressure thereon can be reduced at assembly 148 and additional drive power provide by the drive wheel of the truck or tractor attached to the support for chain bed 48.

The gear teeth ratios on sprockets of servo pump 67, control wheel 65, output sprockets on motors 97 and 197, chain shaft drive sprockets 129 and 229, and chain drive sprockets make exactly equal the direct ratio of linear speed of wheel 65 and r.p.m. output of motors 97 and 197. Pressure adjustment of pneumatic tires on wheel 65 in place of hard tires allows fine and wear adjustments.

I claim:

1. Process of loading an elongated cotton module on a mobile support therefor comprising the steps of tilting the bed of a chain bed relative to a moveable support for said bed and bringing the rear portion of said tilted bed close to but spaced away from the ground to the rear of such tilt bed support and applying the weight of said support to wheels at the end of said tilted bed and removing the weight of said support from other wheels of said support and engaging the ground with the said wheels at the end of said tilted bed and actuating a toothed chain drive means and driving the toothed chain upwards along the tilted bed while said bed is moved toward and along and under the length of said cotton module and a plurality of lift wheels are engaged with successive portions of said module, and moving the chains along said bed at a linear speed equal to the linear traversing movement of said bed relative to said module responsive to the movement of the said bed relative to said ground.

2. In a process of successively loading a plurality of elongated cotton modules on a mobile support therefor comprising the steps of tilting the bed of a chain bed relative to a movable support for said bed and bringing the rear portion of said tilted bed close to but spaced away from the ground to the rear of such tilt bed support and applying the weight of said support to wheels at the end of said tilted bed and removing the weight of said support from the wheels of said support and engaging the ground at a first site with the said wheels and actuating a toothed chain drive means and driving the toothed chain upwards along the tilted bed while said bed is moved toward and along and under the length of one of said cotton modules and a plurality of lift wheels are engaged with successive portions of said module, and moving the chains along said bed at a linear speed equal to the linear traversing movement of said bed relative to said module, and lifting the module onto the forward part of said chain bed and then lowering the chain bed to a horizontal position and transporting said module support and chain bed and module to a second site and, at said second site bringing said first module to the rear of said tilted chain bed and into proximity with a second module and forcefully contacting said second module with the first module and deforming a module face of the second module by a face of first module and thereafter moving said first and second modules as a unit onto said tilt bed trailer.

3. Process as in claim 2 wherein a plurality of modules are successively loaded on said tilt bed apparatus, said process comprising of steps of approaching a first module at a first site and lifting the module onto the forward part of said chain bed and then lowering the chain bed to a horizontal position and transporting said mobile support and chain bed and module to a second site and, at said second site bringing said first module to the rear of said tilted chain bed and into proximity with a second module and forcefully contacting said second module with the first module and deforming a module face of the second module by a face of first module and thereafter moving said first and second modules as a unit onto said tilt bed trailer.

* * * * *